United States Patent [19]

Lew

[11] 4,326,811
[45] Apr. 27, 1982

[54] SEALESS PRESSURIZED MIXING VESSELS

[76] Inventor: Hyok S. Lew, 7890 Oak St., Arvada, Colo. 80005

[21] Appl. No.: 758,141

[22] Filed: Jan. 10, 1977

[51] Int. Cl.$^3$ ............................................. B01F 7/06
[52] U.S. Cl. ..................................... 366/290; 366/297
[58] Field of Search ............... 259/6, 9, 10, 64, 68, 259/69, 95; 366/290, 291, 297, 300

[56] References Cited

U.S. PATENT DOCUMENTS

| | | | |
|---|---|---|---|
| 1,246,003 | 11/1917 | Headley | 259/9 |
| 2,108,990 | 2/1938 | Morlock | 259/6 |
| 2,835,481 | 5/1958 | Cox | 259/95 X |
| 3,035,543 | 5/1962 | Duncan et al. | 259/95 X |
| 3,498,754 | 3/1970 | Yamashita et al. | 259/6 X |
| 3,608,871 | 9/1971 | Harsanyl | 259/95 |

*Primary Examiner*—Philip R. Coe

[57] ABSTRACT

A new mixing vessel is disclosed, which vessel enables a sizable saving of the energy required for the mixing compared with the conventional mixing vessel. The vessel comprises a propeller disposed adjacent to the side wall of a cylindrical tank disposed horizontally, which propeller generates a thrust tangential to the cylindrical vessel wall that creates the mixing motion of the slurry rotating about the axis of the cylindrical vessel. In said arrangement of the cylindrical vessel and the propeller, the propeller shaft is perpendicular to the vessel axis. Therefore, two or more propellers mixing slurries in two or more vessels can be driven by a single shaft disposed through the horizontal cylindrical vessels disposed in a parallel alignment. The bearing supporting the head-end of the driving shaft can be enclosed within a flange sealed with a blind flange, which flange is disposed onto the first mixing vessel in line with the spools housing the shaft. A choke with an annular opening provided by the gap between the shaft surface and the inner surface of the spool disposed on the exit end of the last mixing vessel can be used to restrict the mass flow out from the train of the mixing vessels. The surfaces forming the choke should be lined with an abrasion-resisting material. The bearing supporting the tail-end of the shaft, which is the driven-end, is disposed outside the mixing vessel and away from the slurry discharged through the annular opening of the choke. This arrangement enables to completely eliminate the seals in mechanically agitating the slurries in pressurized vessels.

6 Claims, 5 Drawing Figures

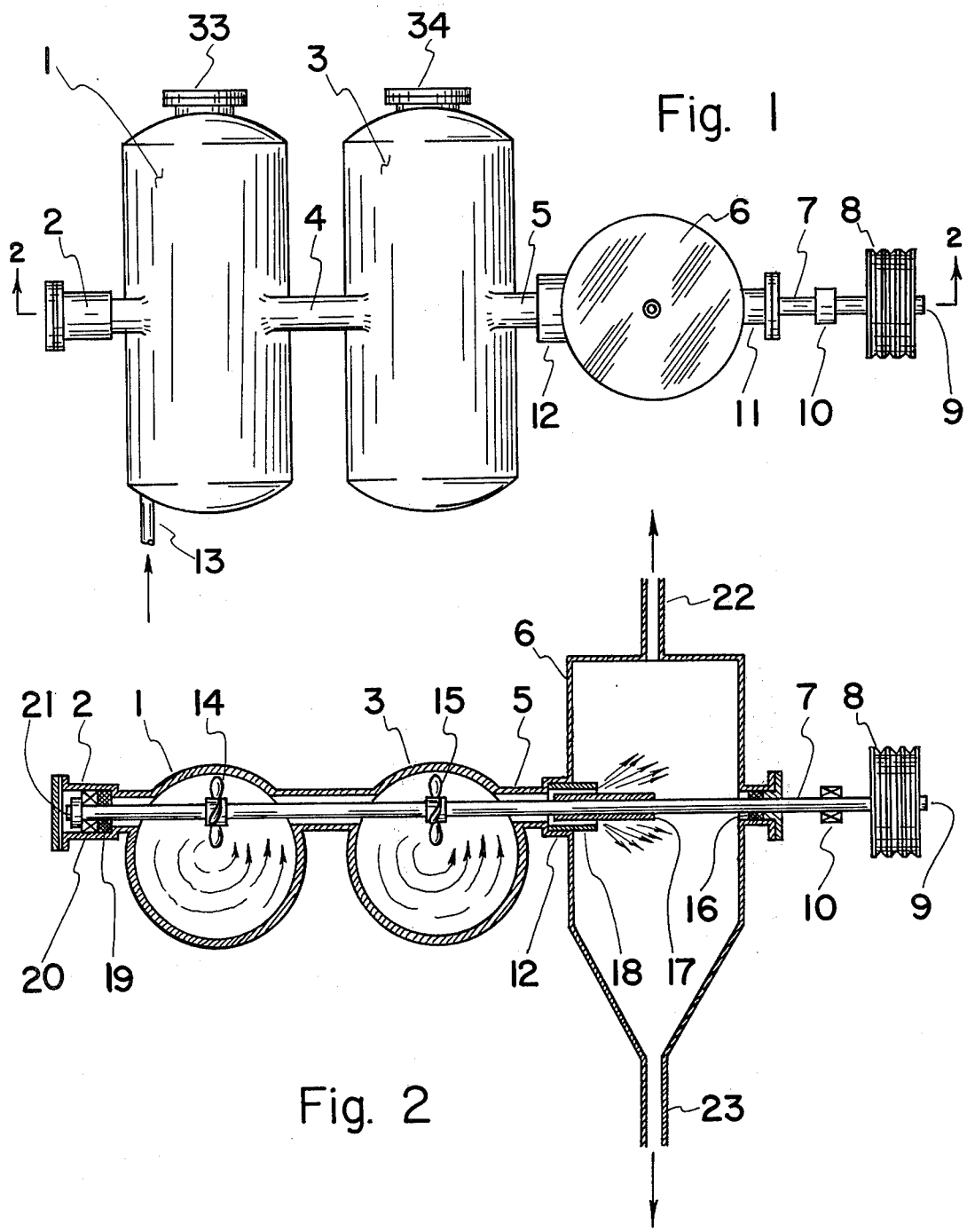

SEALESS PRESSURIZED MIXING VESSELS

The mixing and agitation of the slurry is an important step in the mineral and chemical processing operation. A sizable portion of energy consumed by a mineral or a chemical processing plant is spent to mix and agitate the slurry being processed. It is important to provide a more efficient mixing method in this time of dwindling energy resources. Many chemical reactions employed in the mineral or the chemical processing industry require high pressure and high temperature. Although the method of slurry agitation employing no mechanical seal, such as the magnetic drive or steam or air lift, is available, their application is limited to the reasonably fluid slurries as the torque and the energy delivered to the slurry mixing by such a method is rather low. The most common method of slurry agitation employs the agitator propeller driven by a shaft connected to the power unit such as an electric motor disposed outside the mixing vessel, which shaft extends into the vessel through a mechanical seal that allows the rotational motion of the shaft, but prevents the slurry or gas from leaking. In high pressure and high temperature slurry mixing, the mechanical seal is not only a very expensive item, but also a troublesome part that demands very careful maintenance and frequent replacement. The state of art of slurry mixing in the mineral and chemical industry can be significantly elevated if one provides an idea or ideas that improves the mixing efficiency and thus cuts down the power consumption for the mixing and that enables the elimination of the expensive and trouble some mechanical seals.

The primary object of the present invention is to provide a new vessel for slurry mixing and agitation, which is more efficient compared with existing vessels.

Another object of the present invention is to provide a means for driving of two or more agitation propellers in two or more different vessels by a single shaft. A further object of the present invention is to provide a means for mechanically driving a propeller in a pressurized vessel without using a mechanical seal.

These and other objects will become clear as the description of the present invention proceeds. The principle of the present invention may be described with a greater clarity and specificity by referring to the following figures:

FIG. 1 illustrates the top view of a mixing vessel train constructed in accordance with the principle of the present invention.

FIG. 2 illustrates a section along a vertical plane disecting the vesel train into two symmetrical halves.

Figure 3:
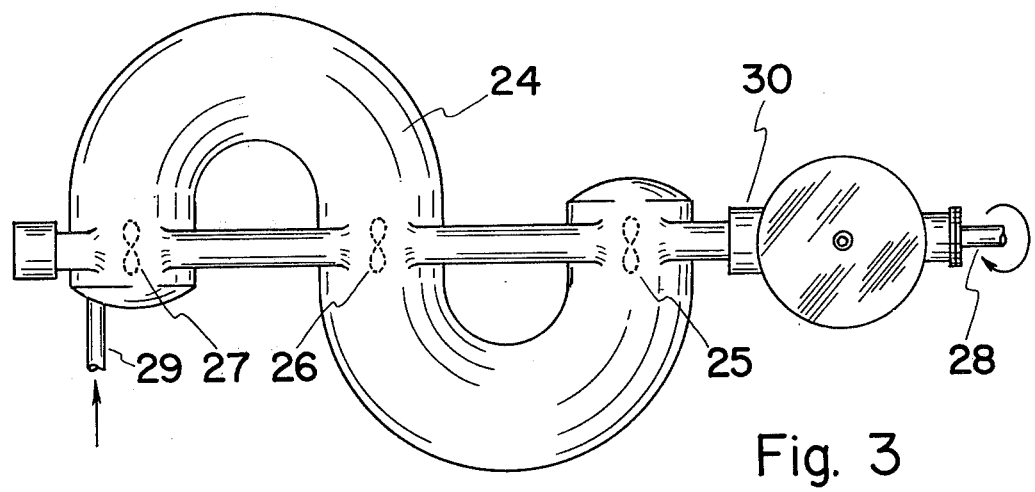
FIG. 3 shows another embodiment of the mixing vessel train constructed in accordance with the principle of the present invention.

In FIG. 1 there is shown the top view of a mixing and agitating vessel train comprising a pair of horizontally disposed cylindrical vessels 1 and 3, and a flash tank 6. The vessels 1 and 3 are connected to each other by a spool 4 and a spool 5 connects vessel 3 to flash tank 6. The shaft 7 runs all the way from the driving end 9 to the flange 2 through flash tank 6, spools 4 and 5. The slurry is fed to vessel 1 though inlet 13 and then to vessel 3 through spool 4. The mixed and reacted slurry is discharged into flash tank 6 through spool 5. Each of mixing vessel 1 and 3 has blind flanges 33 and 34, respectively, to provide an access to the inside of the mixing vessels.

There is shown in FIG. 2 a section taken along a vertical plane 2—2 as shown in FIG. 1. The propellers 14 and 15 are disposed adjacent to the upper portion of the cylindrical walls of the vessel 1 and 3, respectively. Both propellers are rigidly affixed to shaft 7 which is supported by bearing 10 at the tail-end 9 and bearing 20 at the head-end 21. The shaft 7 is driven by a pulley 8 connected to a motor by a belt. The bearing 20 is disposed within a blind flange 2 and separated from slurry by a packing 19. Usually, it is necessary to pressurize the space inside the blind flange 2 by injecting a lubricant. The spool 5 terminates to a choke-housing 12. The choke is composed of a shaft-lining 17 and a spool-lining 18, both of which is made of an abrasion resisting material and fitted to each mating part. There is a narrow annular gap between the shaft-lining 17 and the spool-lining 18, through which the slurry is discharged from vessel 3 into flash tank 6. By employing a proper gap width of the annular choke opening, the slurry discharge rate can be checked at a desired level while maintaining the pressure inside the mixing vessels 1 and 3. A pair of mating, tapered surfaces may be employed for the shaft-lining 17 and spool-lining 18 so that the width of the annular gap between them can be adjusted by varying the relative position of them from each other. The pressure in the flash tank 6 is essentially the same as the atmospheric pressure and, consequently, no seal is needed for the shaft 7 coming out through the flash tank wall. A low pressure packing 16 is provided to prevent the gas leaking. The flash tank 6 has gas outlet 22 and slurry outlet 23.

The propeller 14 disposed adjacent to the cylindrical wall of a cylindrical vessel 1 generates a thrust tangential to the cylindrical wall, which creates the rotational motion of the slurry following the streamlines of coaxial circles. Such a mixing flow pattern accompanies significantly less energy dissipation compared with the conventional mixing vessel arrangement comprising an up-right cylindrical tank and a propeller disposed at the center of the tank on a vertically extending shaft. As a consequence, the slurry obtains a higher velocity for a given amount of power input to the system, which higher velocity creates a turbulence of high degree, which results in a high degree random mixing. The secondary flows at both ends of the vessel and the hydrodynamic instability similar to the Taylor instability contribute in creating the convective mixing. Therefore, the method of mixing provided by the present invention creates greater over-all mixing compared with the conventional system for the same power consumed. It can be easily proved by experiment that the mixing method provided by the present invention is at least 100 percent more effective in suspending the solid particles in the slurry compared with the conventional mixing system.

In FIG. 3, there is shown another embodiment for constructing a mixing vessel train. Instead of using separate vessels as shown in FIG. 1, a continuous S-shaped tube 24 is employed. The propellers 25, 26 and 27 are driven by a single shaft 28 running through a series of spools crossing the S-shaped tube 24. The slurry is fed through inlet 29 and discharged through choke housed inside the choke-housing 30, of which structure is explained in connection with FIG. 2. It should be understood that the adjacent propellers should be opposite-handed to each other to generate a continuous helical slurry paths in the S-shaped tube.

Figure 4:
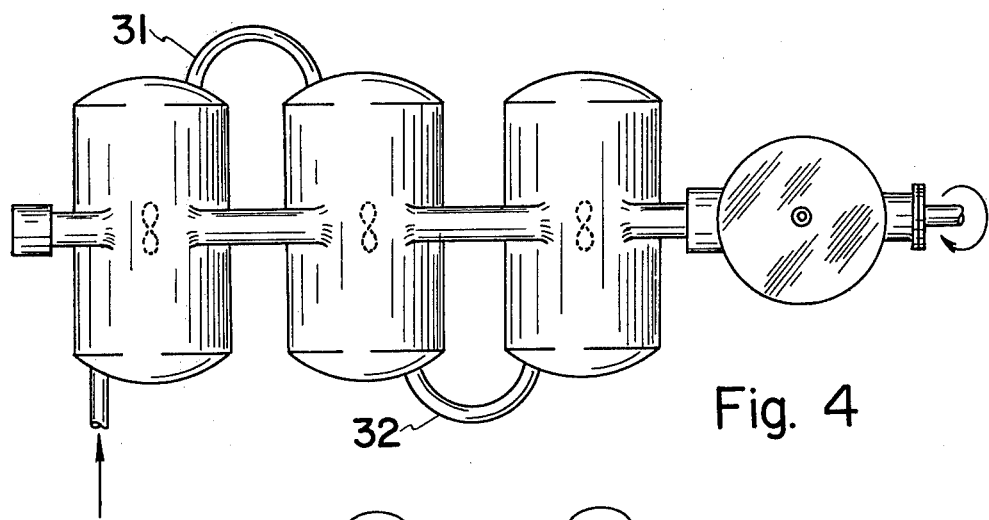
FIG. 4 shows still another embodiment of the mixing vessel train constructed in accordance with the principle of the present invention.

There is shown in FIG. 4 a further embodiment for arranging the mixing vessel train. When a single shaft has to drive many propellers in many mixing vessels, the extended length of the shaft may require one or more intermediate bearings disposed within the spool connecting two adjacent mixing vessels. Under this arrangement, the spools interconnecting the mixing vessels can not be used for a slulrry path, as they are blocked by the bearing. Hence, pipe elbows 31 and 32 are used to provide the passage for the slurry from one mixing vessel to another.

Figure 5:
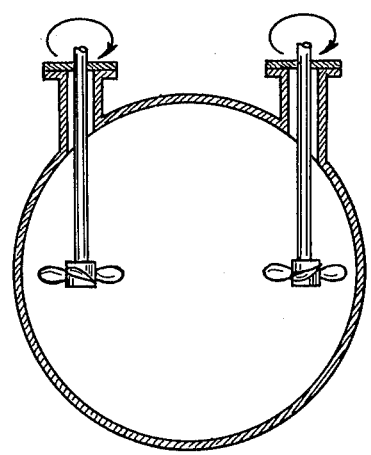
FIG. 5 illustrates an embodiment of disposing a pair of propellers in side-by-side fashion for agitating a very thick slurry.

In FIG. 5, there is shown an embodiment showing a pair of propellers disposed adjacent to two diametric portions of the cylindrical wall of the vessel. When mixing a very thick slurry, where a single propeller is insufficient to deliver sufficient energy to make the slurry mass complete each rotation, it is helpful to use a pair of propellers as shown in FIG. 5. It is easy to visualize the use of the paired-propeller configuration in constructing the mixing vessel train such as shown in FIG. 2. All it takes is to run another shaft and spools at the lower half of the train. Of course, there will be two chokes for such an arrangement.

While the principles of the invention have now been made clear in an illustrative embodiment, there will be immediately obvious to those skilled in the art many modifications of structures, arrangement, proportions, the elements, materials and components used in the practice of the invention which are particularly adapted for specific environments and operating requirements without departing from those principles.

I claim:

1. A mixing device for agitating and blending fluid materials in mineral or in chemical processing, said device comprising:
    (a) a cylindrical vessel disposed horizontally so that its axis is on a horizontal plane, said cylindrical vessel having an inlet and an outlet whereby material to be processed can be fed into and discharged from said vessel;
    (b) a first propeller disposed adjacent to the cylindrical wall of said cylindrical vessel whereby rotation of said first propeller generates a thrust in a direction tangential to the cylindrical surfaces coaxial to the axis of said cylindrical vessel, said thrust creating a rotational mixing motion of the fluid material about the axis of said cylindrical vessel; and
    (c) wherein a plurality of said devices are aligned parallel to each other forming a train of vessels, two adjacent vessels of said train of vessels connected to each other by a spool, whereby each propeller in each vessel of said train of vessels is driven by a single shaft running through said spools interconnecting adjacent vessels.

2. The device as set forth in claim 1 wherein a last spool attached to the last vessel of said train of vessels, through which spool said shaft driving propellers extends from the inside of said train of vessels to the outside, forms a choke having a narrow annular opening between the shaft surface and the inner surface of said last spool, whereby said choke limits the rate of material discharge from the said train of vessels while maintaining the pressure inside said train of vessels.

3. The device as set forth in claim 2 wherein said shaft surface and said inner surface of said last spool forming said choke are lined with an abrasion resisting material.

4. A mixing device for agitating and blending fluid materials in mineral or in chemical processing, said device comprising:
    (a) a cylindrical vessel disposed horizontally so that its axis is on a horizontal plane, said cylindrical vessel having an inlet and an outlet whereby material to be processed can be fed into and discharged from said vessel;
    (b) a first propeller disposed adjacent to the cylindrical wall of said cylindrical vessel whereby rotation of said first propeller generates a thrust in a direction tangential to the cylindrical surfaces coaxial to the axis of said cylindrical vessel, said thrust creating a rotational mixing motion of the fluid material about the axis of said cylindrical vessel;
    (c) wherein a plurality of said propellers generating thrusts tangential to the cylindrical vessel wall to create said rotational mixing motion are disposed in series in said cylindrical vessel; and
    (d) wherein said cylindrical vessel comprises a long horizontal vessel curved to one or to multiple S-shapes, wherein said propellers generating tangential thrusts are affixed to a shaft enclosed within a series of spools, each of said spools connected to adjacent segments of said S-shaped vessel and, thus, said series of spools forming a straight pass short-cutting the winding path of said s-shaped vessel.

5. The device as set forth in claim 4 wherein the end most piece of said a series of spools forms a choke provided by the narrow annular opening between the inner surface of the spool wall and the outer surface of said shaft driving said propellers, through which choke the reacted slurry is discharged.

6. The device as set forth in claim 4 wherein each segment of said s-shaped vessel has a pair of propellers generating tangential thrusts, said pair of propellers disposed diametrically to each other and driven by a pair of shafts contained in a pair of series of spools forming a pair of short-cutting paths of said s-shaped vessel at the upper and lower halves, respectively.

* * * * *